US012573729B2

(12) United States Patent
Tang et al.

(10) Patent No.: US 12,573,729 B2
(45) Date of Patent: Mar. 10, 2026

(54) POSITIVE ELECTRODE PLATE AND LITHIUM-ION BATTERY INCLUDING THE POSITIVE ELECTRODE PLATE

(71) Applicant: ZHUHAI COSMX BATTERY CO., LTD., Zhuhai (CN)

(72) Inventors: Weichao Tang, Zhuhai (CN); Suli Li, Zhuhai (CN); Wei Zhao, Zhuhai (CN); Chunyang Liu, Zhuhai (CN); Ruofan Chen, Zhuhai (CN); Junyi Li, Zhuhai (CN); Yanming Xu, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 642 days.

(21) Appl. No.: 18/068,748

(22) Filed: Dec. 20, 2022

(65) Prior Publication Data

US 2023/0124048 A1     Apr. 20, 2023

Related U.S. Application Data

(63) Continuation of application No. PCT/CN2021/116799, filed on Sep. 6, 2021.

(30) Foreign Application Priority Data

Sep. 25, 2020     (CN) .......................... 202011025808.7

(51) Int. Cl.
| | |
|---|---|
| *H01M 50/581* | (2021.01) |
| *H01M 4/02* | (2006.01) |
(Continued)

(52) U.S. Cl.
CPC ......... *H01M 50/581* (2021.01); *H01M 4/625* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2017/0309970 A1 * 10/2017 Kim ........................ H01M 4/62
2019/0140280 A1 5/2019 Zhang et al.
(Continued)

FOREIGN PATENT DOCUMENTS

| CN | 101471435 A | 7/2009 |
|---|---|---|
| CN | 102959768 A | 3/2013 |
(Continued)

OTHER PUBLICATIONS

International Search Report and Written Opinion issued in corresponding PCT Application No. PCT/CN2021/116799, dated Dec. 1, 2021.
(Continued)

*Primary Examiner* — Ula C Ruddock
*Assistant Examiner* — Maria F Orozco
(74) *Attorney, Agent, or Firm* — Westbridge IP LLC

(57) ABSTRACT

Disclosed are a positive electrode plate and a lithium-ion battery including the positive electrode plate. The positive electrode plate includes a positive current collector, a safety coating layer, a composite fusion layer, and a positive active material layer; the safety coating layer comprises a first conductive agent, a first binder, a functional microsphere, and an auxiliary agent. The safety coating layer has conductive performance at normal temperature, and has the advantages of increasing a contact area between an active material and the current collector, improving the electrical conductivity, and effectively reducing polarization of the battery; when the use temperature of the positive electrode plate reaches 120° C. or above, the functional microsphere will be melted to form a plurality of continuous electron
(Continued)

Schematic diagram of a positive electrode plate structure at normal temperature

Schematic diagram of thermal blocking of a positive electrode plate structure blocking layers, the coating layer blocks current, internal blocking is formed inside the battery, and the occurrence of further thermal runaway of the battery is prevented.

19 Claims, 2 Drawing Sheets

(51) Int. Cl.
H01M 4/62 (2006.01)
H01M 10/0525 (2010.01)

(56) References Cited

U.S. PATENT DOCUMENTS

| | | | | |
|---|---|---|---|---|
| 2020/0161639 A1* | 5/2020 | Zhang | ................... | H01M 4/366 |
| 2023/0089391 A1* | 3/2023 | Tang | ................... | H01M 4/0404 429/217 |
| 2023/0095575 A1* | 3/2023 | Tang | ................... | H01M 4/622 429/233 |

FOREIGN PATENT DOCUMENTS

| | | | | | |
|---|---|---|---|---|---|
| CN | 105449263 A | * | 3/2016 | | |
| CN | 107004858 A | | 8/2017 | | |
| CN | 107749480 A | | 3/2018 | | |
| CN | 108075101 A | | 5/2018 | | |
| CN | 108091825 A | * | 5/2018 | ........... | H01M 4/133 |
| CN | 108511689 A | | 9/2018 | | |
| CN | 109585780 A | | 4/2019 | | |
| CN | 110429240 A | | 11/2019 | | |
| CN | 110504407 A | * | 11/2019 | ........... | H01M 4/622 |
| CN | 111199833 A | | 5/2020 | | |
| CN | 111200160 A | | 5/2020 | | |
| JP | 2019008961 A | | 1/2019 | | |

OTHER PUBLICATIONS

Lu et al., Research on effect of conductive pre-coating aluminum foil on LiFePO4 battery performance, Battery Technology, vol. 40, No. 7, pp. 1347-1349, dated Jul. 20, 2016.

Wu et al., Hot air drying characteristics of electrode coatings for Li-ion battery, Battery Bimonthly, vol. 50, No. 1, pp. 45-49, dated Feb. 25, 2020.

* cited by examiner

Schematic diagram of a positive electrode plate structure at normal temperature

Schematic diagram of thermal blocking of a positive electrode plate structure

POSITIVE ELECTRODE PLATE AND LITHIUM-ION BATTERY INCLUDING THE POSITIVE ELECTRODE PLATE

CROSS-REFERENCE TO RELATED APPLICATIONS

This disclosure is a continuation of International Application No. PCT/CN2021/116799, filed on Sep. 6, 2021, which claims priority to Chinese Patent Application No. 202011025808.7, filed on Sep. 25, 2020. The disclosures of the aforementioned disclosures are hereby incorporated by reference in their entireties.

TECHNICAL FIELD

The present disclosure relates to the field of high-safety secondary batteries, and in particular, to a positive electrode plate and a lithium-ion battery including the positive electrode plate.

BACKGROUND

Secondary batteries mainly include lithium-ion batteries, lead-acid batteries, sodium-ion batteries, fluoride-ion batteries, zinc-ion batteries, nickel-hydrogen batteries and so on. The lithium-ion batteries have the advantages of high energy density, long life and environmental protection and are currently mainly used in energy storage, digital electronics, power vehicles and other fields. In recent years, the market has put forward higher energy density requirements for lithium-ion batteries. Conventional lithium-ion batteries are mainly composed of positive electrodes, negative electrodes, electrolytes, and separators. Since the electrolytes in lithium-ion batteries is mainly composed of organic solvents, there are safety problems such as liquid leakage, fire and explosion during use.

In order to improve the safety of lithium-ion batteries, the main solutions currently include PTC coating, high-safety separators, high-safety electrolytes, and PTC tabs. The main improvement directions of high-safety separators include safety substrates and safety coating layers, etc; the main development directions of high-safety electrolytes include high-safety additives and high-safety flame retardants, etc. The PTC coating has good safety. At present, there are mainly PTC devices outside the secondary battery and PTC devices inside the secondary battery; wherein, the main representative of the PTC device outside the secondary battery is a PTC tab, and the main representative of the PTC device inside the secondary battery is PTC coating layer. At present, some progress has been made in the direction of high-safety separators, high-safety electrolytes and PTC tabs, but the improvement effect is limited.

The current key improvement direction is to develop a high-safety PTC coating inside the lithium-ion battery. At present, the PTC coating has problems such as high resistance, poor thermal barrier properties, poor compatibility with solvents, and poor PTC effect in the actual application process.

SUMMARY

The present disclosure provides a positive electrode plate and a lithium-ion battery including the positive electrode plate; the positive electrode plate is coated with a safety coating layer, the safety coating layer is coated on the surface of a positive electrode current collector, and the safety coating layer has conductivity and high temperature blocking properties, which not only does not affect the electronic conductivity of lithium-ion batteries in normal environments, but also improves the safety performance of lithium-ion batteries.

The purpose of this disclosure is to achieve through the following technical solutions:

A positive electrode plate includes a positive electrode current collector, a safety coating layer, a composite fusion layer and a positive electrode active material layer, wherein, the safety coating layer, the composite fusion layer and the positive electrode active material are arranged on a surface of the positive electrode current collector in sequence.

The safety coating layer includes a functional microsphere, a first positive electrode active material, a first conductive agent, a first binder and an auxiliary agent.

The positive electrode active material layer includes a second positive electrode active material, a second conductive agent and a second binder.

The composite fusion layer includes a functional microsphere, a first positive electrode active material, a first conductive agent, a first binder, a second positive electrode active material, a second conductive agent, a second binder, and an auxiliary agent.

According to the present disclosure, the safety coating layer includes the following components by weight percentage: 20-90 wt % of the functional microsphere, 5-60 wt % of the first positive electrode active material, 2.9-30 wt % of the first conductive agent, 2-40 wt % of the first binder and 0.1-10 wt % of the auxiliary agent.

Preferably, the safety coating layer includes the following components by weight percentage: 20-70 wt % of the functional microsphere, 5-40 wt % of the first positive active material, 2.9-25 wt % of the first conductive agent, 2-30 wt % of the first binder and 0.1-5 wt % of the auxiliary agent.

Preferably, the safety coating layer includes the following components by weight percentage: 30-60 wt % of the functional microsphere, 10-30 wt % of the first positive electrode active material, 5-20 wt % of the first conductive agent, 5-20 wt % of the first binder and 0.1-4 wt % of the auxiliary agent.

The weight percentage of the functional microsphere is 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt % or 90 wt %.

The weight percentage of the first positive electrode active material is 5 wt %, 9 wt %, 16 wt %, 20 wt %, 25 wt %, 30 wt %, 35 wt %, 40 wt %, 45 wt %, 50 wt %, 55 wt % or 60 wt %.

The weight percentage of the first conductive agent is 2.9 wt %, 3 wt %, 4 wt %, 5 wt %, 8 wt %, 10 wt %, 12 wt %, 15 wt %, 18 wt %, 20 wt %, 22 wt %, 25 wt %, 28 wt % or 30 wt %.

The weight percentage of the first binder is 2 wt %, 4 wt %, 5 wt %, 8 wt %, 10 wt %, 12 wt %, 15 wt %, 18 wt %, 20 wt %, 22 wt %, 25 wt %, 28 wt %, 30 wt %, 32 wt %, 35 wt %, 38 wt % or 40 wt %.

The weight percentage of the auxiliary agent is 0.1 wt %, 0.5 wt %, 1 wt %, 2 wt %, 3 wt %, 4 wt %, 5 wt %, 6 wt %, 7 wt %, 8 wt %, 9 wt % or 10 wt %.

According to the present disclosure, the positive electrode active material layer includes the following components by weight percentage: 80-99 wt % of the second positive electrode active material, 0.5-10 wt % of the second conductive agent and 0.5-10 wt % of the second binder.

Preferably, the positive electrode active material layer includes the following components by weight percentage:

84-99 wt % of the second positive electrode active material, 0.5-8 wt % of the second conductive agent and 0.5-8 wt % of the second binder.

Preferably, the positive electrode active material layer includes the following components by weight percentage: 90-98 wt % of the second positive electrode active material, 1-5 wt % of the second conductive agent and 1-5 wt % of the second binder.

According to the present disclosure, the composite fusion layer is formed by the mutual penetration of the safety coating layer and the positive electrode active material layer during the preparation process. The weight percentage of the functional microsphere, the first positive electrode active material, the first conductive agent, the first binder and auxiliary agent in the composite fusion layer is: 20-90 wt % of the functional microsphere, 5-60 wt % of the first positive electrode active material, 2.9-30 wt % of the first conductive agent, 2-40 wt % of the first binder and 0.1-10 wt % of the auxiliary agent; the weight percentage between the second positive electrode active material, the second conductive agent and the second binder in the composite fusion layer is: 80-99 wt % of the positive active material, 0.5-10 wt % of the second conductive agent and 0.5-10 wt % of the second binder. Further, the mass ratio of the first positive electrode active material and the second positive electrode active material is not specifically defined and may be simultaneously contained.

According to the present disclosure, a thickness of the positive electrode current collector is 0.1 μm-20 μm; preferably, 0.5 μm, 1 μm, 3 μm, 4 μm, 5 μm, 8 μm, 10 μm, 12 μm or 15 μm.

According to the present disclosure, a thickness of the safety coating layer is 0.1 μm-8 μm; Preferably, 0.2 μm-6 μm, such as 0.3 μm, 0.5 μm, 0.8 μm, 1 μm, 1.5 μm, 2 μm, 2.5 μm, 3 μm, 5 μm, 5.5 μm or 6 μm.

According to the present disclosure, a thickness of the composite fusion layer is 0.001-0.5 μm; such as 0.001 μm, 0.005 μm, 0.01 μm, 0.02 μm, 0.05 μm, 0.08 μm, 0.1 μm, 0.2 μm, 0.3 μm, 0.4 μm or 0.5 μm.

According to the present disclosure, a thickness of the positive electrode active material layer is 5-200 μm, preferably, 5 μm-100 μm, such as 5 μm, 10 μm, 15 μm, 20 μm, 25 μm, 30 μm, 35 μm, 40 μm, 45 μm, 50 μm, 55 μm, 60 μm, 65 μm, 70 μm, 80 μm, 90 μm or 100 μm.

According to the present disclosure, a particle size of the functional microsphere is 50 nm-6.5 μm; preferably, 500 nm to 5 μm.

According to the present disclosure, the first conductive agent and the second conductive agent are the same or different, and are at least one independently selected from the group consisting of conductive carbon black, Ketjen black, conductive fibers, conductive polymers, acetylene black, carbon nanotubes, graphene, flake graphite, conductive oxides and metal particles.

According to the present disclosure, the first binder is selected from a water-based binder or an oil-based binder, the water-based binder is at least one selected from the group consisting of acrylate, poly(meth)acrylic acid, styrene-butadiene rubber (SBR), polyvinyl alcohol, polyacetic acid Vinyl ester, carboxymethyl cellulose (CMC), sodium carboxymethyl cellulose (CMC-Na), carboxyethyl cellulose, waterborne polyurethane, ethylene-vinyl acetate copolymer, polyacrylic copolymer, polystyrene sulfonate Lithium acid, water-based silicone resin, nitrile-polyvinyl chloride blend, styrene-acrylic latex, pure styrene latex and combinations of blends and copolymers derived from the modified polymer; the oil-based binder is one or more combinations of polytetrafluoroethylene, polyvinylidene fluoride, and polyvinylidene fluoride-hexafluoropropylene.

According to the present disclosure, the auxiliary agent is selected from a dispersant and/or a filler; the dispersant is at least one selected from the group consisting of branched chain alcohols, triethyl phosphate, polyethylene glycol, fluorinated polyethylene oxide, polyethylene oxide, stearic acid, At least one of sodium dodecyl benzene sulfonate, sodium cetyl sulfonate, fatty acid glycerides, sorbitan fatty acid esters and polysorbates; the filler is nano-filler (nano silicon dioxide, aluminum oxide, zirconium dioxide, boron nitride, aluminum nitride, etc) or nano-oxide electrolyte, etc.

According to the present disclosure, the first positive electrode active material and the second positive electrode active material are selected from one or a combination of lithium iron phosphate (LiFePO4), lithium cobalt oxide (LiCoO2), lithium nickel cobalt manganese oxide (LizNixCoyMn1-x-yO2, where 0.95≤z≤1.05, x>0, y>0, 0<x+y<1), lithium manganate (LiMnO2), lithium nickel cobalt aluminate oxide (LizNixCoyAl1-x-yO2, where 0.95 x>0, y>0, 0.8≤x+y<1), lithium nickel cobalt manganese aluminate oxide (LizNixCoyMnwAl1-x-y-wO2, where 0.95≤z≤1.05, x>0, y>0, w>0, 0.8≤x+y+w<1), nickel-cobalt-aluminum-tungsten material, lithium-rich manganese-based solid solution positive electrode Materials (xLi2MnO3·(1-x)LiMO2, where M=Ni/Co/Mn), lithium nickel cobalt oxide (LiNixCoyO2, where x>0, y>0, x+y=1), lithium nickel titanium magnesium oxide (LiNixTiyMgzO2, where x>0, y>0, z>0, x+y+z=1), lithium nickelate (Li2NiO2), lithium spinel manganate (LiMn2O4), or nickel cobalt tungsten materials.

According to the present disclosure, the second binder is selected from one or more combinations of polytetrafluoroethylene, polyvinylidene fluoride, and polyvinylidene fluoride-hexafluoropropylene.

The present disclosure also provides a secondary battery, which includes the above-mentioned positive electrode plate.

The present disclosure also provides a method for preparing the above-mentioned positive electrode plate, the method includes the steps of:

1) Preparation of oil-based safety coating layer or water-based safety coating layer:

a. Oil-Based Safety Coating Layer 200-1000 parts by mass of oily solvent, 20-90 parts by mass of functional microsphere, 5-60 parts by mass of first positive electrode active material, 2.9-30 parts by mass of first conductive agent, and 2-40 parts by mass of oil-based binder in the first binder and 0.1-10 parts by mass of auxiliary agent are uniformly mixed, and are coated on the surface of a positive electrode current collector. After drying at 80-110° C. for 12-72 hours, a current collector with an oil-based safety coating layer on the surface is obtained;

b. Water-Based Safety Coating Layer 200-1000 parts by mass of water, 20-90 parts by mass of functional microsphere, 5-60 parts by mass of first positive electrode active material, 2.9-30 parts by mass of first conductive agent, and 2-40 parts by mass of water-based binder in first binder and 0.1-10 parts by mass of auxiliary agent are uniformly mixed, and are coated on the surface of a current collector, and after drying at 80-110° C. for 12-72 hours, the current collector with a water-based safety coating layer on the surface is obtained;

2) 200-1000 parts by mass of oily solvent, 80-99 parts by mass of second positive electrode active material, 0.5-1 part by mass of second conductive agent, and 0.5-10 parts by mass of second binder are uniformly mixed and coated on the surface of the current collector containing the oil-based safety coating layer or the surface of the current collector containing the water-based safety coating layer according to the step 1). The coated current collector is dried at 80-110° C. for 12-72 hours to obtain the positive electrode plate.

According to the present disclosure, in step 1), preferably adopt the following method to carry out:

a. Oil-Based Safety Coating Layer 200-1000 parts by mass of the oil-based solvent, 5-60 parts by mass of the first positive electrode active material, 2.9-30 parts by mass of the first conductive agent, 2-40 parts by mass of the oil-based binder in the first binder, and 0.1-10 parts by mass of auxiliary agent are uniformly mixed and filtered by a 100-mesh sieve, 20-90 parts by mass of functional microsphere are added to the above mixture, uniformly mixed and filtered by a 100-mesh sieve again, and coated on the surface of a positive electrode current collector. After drying at 80-110° C. for 12-72 hours, a current collector with an oil-based safety coating layer on the surface is obtained;

b. Water-Based Safety Coating Layer 200-1000 parts by mass of water, 5-60 parts by mass of the first positive electrode active material, 2.9-30 parts by mass of the first conductive agent, 2-40 parts by mass of the water-based binder in the first binder, and 0.1-10 parts by mass of auxiliary agent are mixed uniformly and filtered through a 100-mesh sieve, then 20-90 parts by mass of functional microsphere are added to the above mixture, uniformly mixed and filtered by a 100-mesh sieve again, and are coated on the surface of a current collector. After drying at 80-110° C. for 12~72 hours, a current collector containing an water-based safety coating layer on the surface is obtained.

According to the present disclosure, the oily solvent is at least one selected from the group consisting of N-methylpyrrolidone, hydrofluoroether, acetone, tetrahydrofuran, dichloromethane, and pyridine.

The present disclosure provides a positive electrode plate and a lithium-ion battery containing the positive electrode plate. The safety coating layer includes a first positive electrode active material, a first conductive agent, a first binder, a functional microsphere and an auxiliary agent; the functional microsphere may be stacked disorderly and has conductivity, so that the safety coating layer has electrical conductivity at room temperature, and effectively reduce the internal resistance of the battery, and at the same time has the advantages of increasing the contact area between the positive electrode active material and the positive electrode current collector, improving the electrical conductivity, and effectively reducing the polarization of the battery; when the use temperature of the positive electrode plate reaches up to the heat-sensitive temperature and above, the functional microsphere may melt to form a plurality of continuous electron blocking layers, the morphology and structure of the functional microsphere may change, the coating layer may form a current block, and an internal block may be formed inside the battery, which may prevent the occurrence of further thermal runaway, improving the pass rate of the secondary battery in the puncture test, thermal runaway test, drop test, and high temperature test, and improving the safety performance of the secondary battery. The first positive electrode active material is introduced into the safety coating layer, which not only maintains the high safety of the positive electrode plate, but also increases the overall active material content in the positive electrode plate, and thereby improving the overall energy density of the battery.

DETAILED DESCRIPTIONS OF THE EMBODIMENTS

Figure 1:
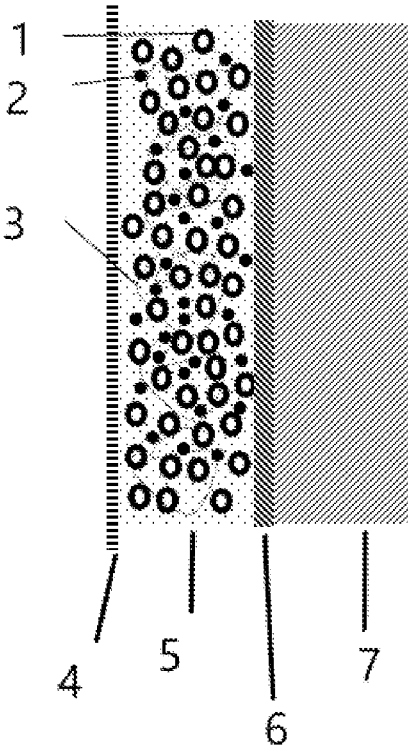
FIG. 1 is a schematic diagram of the positive electrode plate of the present disclosure.
Figure 1:
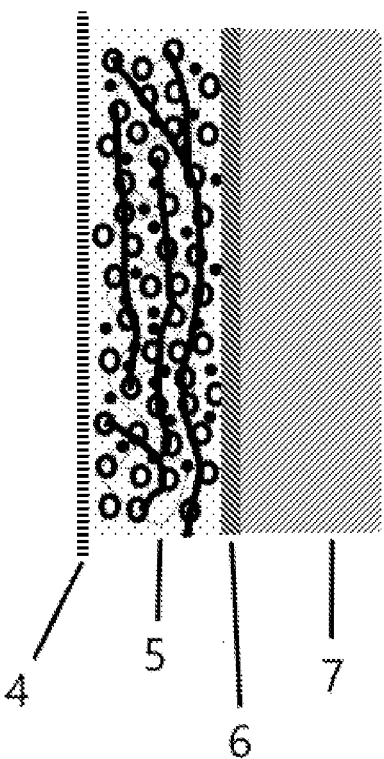
Figure 2:
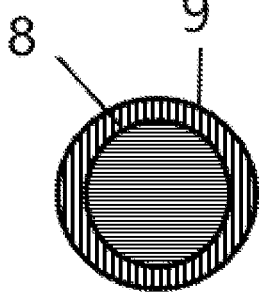
FIG. 2 is a schematic diagram of the functional microsphere of the present disclosure.

The present disclosure will be described in detail below with reference to specific embodiments. It should be understood that the following embodiments are only illustrative to illustrate and explain the present disclosure, and should not be construed as limiting the protection scope of the present disclosure. All technologies implemented based on the above content of this disclosure are covered within the protection scope intended by this disclosure.

<Functional Microsphere>

As mentioned above, the present disclosure provides a functional microsphere, the functional microsphere has a core-shell structure, which includes a shell layer and a core, the material for forming the shell layer includes a heat-sensitive polymer, and the material for forming the core includes conductive material.

According to the present disclosure, in the functional microsphere, the thickness of the shell layer is 1 nm to 2000 nm. For example, 1 nm, 10 nm, 50 nm, 100 nm, 200 nm, 500 nm, 1000 nm or 2000 nm.

According to the present disclosure, the heat-sensitive polymer is selected from thermoplastic polymers that form a relatively stable system with the electrolyte and have phase change properties. The heat-sensitive temperature range of the heat-sensitive polymer is, for example, 110° C. to 160° C., for example, 115° C. to 160° C.

Exemplarily, the heat-sensitive polymer is at least one selected from the group consisting of polyethylene, polypropylene, polyamide, polyesteramide, polystyrene, polyvinyl chloride, polyester, polyurethane, ethylene vinyl acetate polymer, ethylene acrylate polymer, olefin copolymers, propylene copolymers, ethylene copolymers, and polymers modified by monomers thereof.

According to the present disclosure, the particle size of the conductive material is 0.1 nm-4.5 μm. For example, 1 nm, 5 nm, 10 nm, 0.1 μm, 0.5 μm, 1 μm, 2 μm, 3 μm or 4.5 μm.

According to the present disclosure, the conductive material is at least one selected from the group consisting of conductive polymers, conductive oxides, metal particles, carbon materials, and conductive ceramics, such as at least one of polypyrrole, polythiophene, conductive carbon black, ketjen black, and conductive fibers, acetylene black, carbon nanotubes, graphene, flake graphite, silicon carbide, molybdenum disilicide, and lanthanum cobaltate.

According to the present disclosure, when the temperature of the functional microsphere reaches the heat-sensitive range, the surface heat-sensitive polymer melts, releasing the inner conductive material. The inner conductive material has good conductivity and part of the conductive material may be dissolved in the electrolyte. A chain-shaped conductive channel is formed, and electrons may continue to be turned on, that is, a micro-short circuit is formed inside the lithium-ion battery, which slows down the degree of thermal runaway of the lithium-ion battery.

The present disclosure also provides a method for preparing the above functional microsphere, the method including the following steps:

Using a liquid coating method or a solid phase coating method, the shell layer-forming material including the heat-sensitive polymer was coated on the surface of the core-forming material including the conductive material to prepare the microspheres. The microsphere has a core-shell structure, that is, includes a shell layer and a core, the material for forming the shell layer includes a heat-sensitive polymer, and the material for forming the core includes a conductive material.

Exemplarily, in the case of adopting the liquid-phase coating method, the liquid-phase coating method includes the following steps:

The material for forming the shell layer was dissolved in a solvent by stirring to form a solution containing the material for forming the shell layer; the material for forming the core was added to the above solution, stirred and mixed evenly; the solvent was removed from the mixed system by vacuum heating drying or spray drying to obtain the microspheres. Wherein, the microspheres have a core-shell structure, which include a shell layer and a core, the material forming the shell layer includes a heat-sensitive polymer, and the material forming the core includes a conductive material.

The solvent is at least one selected from the group consisting of cresol, benzene, methyl ethyl ketone, nitrobenzene, trichloroacetic acid, chlorophenol, toluene, xylene, tetrachloroethane, styrene, isopropane, chloroform and carbon tetrachloride.

Exemplarily, in the case of adopting the solid-phase coating method, the solid-phase coating method includes the following steps:

The material forming the shell layer and the material forming the core were solid-phase coated by stirring, ball milling and mechanical fusion, and then were heated to the temperature of the heat-sensitive range of the heat-sensitive polymer, and the material forming the shell layer was formed on the surface of the material forming the core as a coating layer The experimental methods used in the following Examples are conventional methods unless otherwise specified; the reagents, materials, etc. used in the following Examples may be obtained from commercial sources unless otherwise specified.

In the description of the present disclosure, it should be noted that the terms of "first", "second", etc. are only used for descriptive purposes, and do not indicate or imply relative importance.

Preparation Example 1

240 g of polyethylene and 4 g of silicon carbide conductive ceramics (average particle diameter of 1 micron) were solid-phase coated by ball milling, heated to 130° C., and the molten heat-sensitive polymer and silicon carbide conductive ceramic particles were ball-milled for 36 h. After ball milling, the heat-sensitive polymer formed a heat-sensitive polymer coating layer on the surface of the conductive ceramic to obtain microspheres (with an average particle diameter of 5.5 microns) coated with the heat-sensitive polymer.

Preparation Example 2

70 g of ethylene-propylene copolymer and 1.5 g of silicon carbide conductive ceramics (average particle diameter of 1 micron) were solid-phase coated by ball milling, heated to 130° C., and the molten heat-sensitive polymer and silicon carbide conductive ceramic particles were balled. After ball milling for 72 hours, the heat-sensitive polymer formed a heat-sensitive polymer coating layer on the surface of the conductive ceramic after ball milling, and obtains microspheres (with average particle diameter of 2.5 microns) coated with the heat-sensitive polymer on the conductive ceramic.

Preparation Example 3-12

The preparation process is as same as that of Preparation Example 1, except that different heat-sensitive polymers and conductive ceramics are selected, as shown in Table 1, and the structural parameters of the prepared functional microsphere are shown in Table 1.

TABLE 1

| NO. | Heat-sensitive polymers | Conductive Ceramics | Functional microsphere particle size/(μm) | Conductive ceramic particle size/(μm) | Heat-sensitive temperature (° C.) |
|---|---|---|---|---|---|
| | | Composition of functional microspheres prepared in Preparation Examples 1-12 | | | |
| Example 1 | polyethylene | Silicon carbide | 5.5 | 1.0 | 115 |
| Example 2 | Ethylene-propylene copolymer | Silicon carbide | 2.5 | 1.0 | 130 |
| Example 3 | polypropylene | Lanthanum cobaltate | 4.0 | 2.5 | 135 |
| Example 4 | polyethylene | Molybdenum Disilicide | 5.5 | 5.0 | 130 |
| Example 5 | polypropylene | Acetylene black | 4.0 | 3.0 | 138 |
| Example 6 | Ethylene-vinyl acetate copolymer | Conductive carbon black | 4.5 | 3.2 | 126 |
| Example 7 | Polyurethane | Lanthanum cobaltate: silicon carbide (mass ratio 1:2) | 2.0 | 1.5 | 127 |
| Example 8 | Propylene-ethylene-acrylate copolymer | Carbon nanotubes: molybdenum disilicide (mass ratio 1:2) | 4.5 | 3.0 | 120 |
| Example 9 | Propylene-ethylene-acrylate copolymer | Conductive carbon black: silicon carbide (mass ratio 1:2) | 2.5 | 1.8 | 125 |

TABLE 1-continued

| | | | Functional microsphere particle size/(µm) | Conductive ceramic particle size/(µm) | Heat-sensitive temperature (° C.) |
|---|---|---|---|---|---|
| NO. | Heat-sensitive polymers | Conductive Ceramics | | | |
| Example 10 | polyethylene | Silicon carbide | 5.5 | 4.5 | 120 |
| Example 11 | polyethylene | Silicon carbide | 3.8 | 2.8 | 120 |
| Example 12 | polyethylene | Silicon carbide | 5.0 | 4.0 | 120 |

Composition of functional microspheres prepared in Preparation Examples 1-12

Example 1

S1: Preparation of a safety coating layer slurry: 1000 g of hydrofluoroether, 2.9 g of CNT, 2 g of polyvinylidene fluoride and 0.1 g of triethyl phosphate were mixed uniformly and filtered by a 100-mesh sieve. Add 90 g of polyethylene functional microsphere (functional microsphere prepared in Preparation Example 1) with a particle size of 5.5 µm and 5.0 g of lithium cobaltate were uniformly mixed and filtered through a 100-mesh screen to obtain a safety coating layer slurry;

S2: Preparation of positive electrode slurry: 500 g of NMP, 98 g of lithium cobaltate, 1 g of conductive agent conductive carbon black, and 1 g of binder polyvinylidene fluoride were mixed uniformly to obtain a positive electrode coating slurry;

S3: Preparation of positive electrode plate: the safety coating layer slurry in S1 was coated on the surface of an aluminum foil current collector, and after drying at 110° C. for 12 hours, a current collector with the safety coating layer on the surface was obtained; the positive electrode coating slurry in S2 is coated on the surface of the current collector with the safety coating layer on the surface to obtain a positive electrode plate after drying, tableting, and cutting. The safety coating layer and the positive active material layer penetrate each other during the drying and tableting process to form a composite fusion layer. The thickness of the composite fusion layer may be observed by scanning electron microscopy and EDS analysis;

S4: Preparation of negative electrode plate: 400 g of deionized water, 97 g of graphite, 0.5 g of conductive carbon black, 1.0 g of CMC, and 1.5 g of styrene-butadiene rubber were uniformly mixed, and then coated on a negative electrode current collector after drying. The drying process belongs to the conventional process in the industry;

S5: Preparation of lithium-ion battery: The positive electrode, negative electrode, and separator are laminated or wound to prepare lithium-ion battery cells. After baking, liquid injection, chemical formation, and packaging, high-safety lithium-ion batteries are obtained.

Example 2

S1: Preparation of a safety coating layer slurry: 200 g of water, 10 g of acetylene black, 15 g of CNT, 30 g of styrene-butadiene rubber, 10 g of carboxymethyl cellulose and 10 g of polyethylene glycol were mixed and filtered by a 100-mesh sieve, 5 g of nickel-cobalt-manganese ternary material, 20 g of ethylene-propylene copolymer functional microsphere with a particle size of 2.5 µm (functional microsphere prepared in Preparation Example 1) were added to the above mixture, and mixed evenly, and filtered through a 100-mesh sieve again. Then, the safety coating layer slurry was obtained;

S2: Preparation of positive electrode slurry: 500 g of NMP, 96 g of lithium cobaltate, 2 g of conductive carbon black as a conductive agent, and 2 g of polyvinylidene fluoride as a binder were uniformly mixed to obtain a positive electrode coating slurry;

S3: Preparation of positive electrode plate: the safety coating layer slurry in S1 was coated on the surface of an aluminum foil current collector, and after drying at 90° C. for 72 hours, a current collector with a safety coating layer on the surface was obtained; the positive electrode coating slurry in S2 is coated on the surface of the current collector with the safety coating layer on the surface to obtain the positive electrode plate after drying, pressing and cutting;

S4: Preparation of negative electrode plate: 350 g of deionized water, 90 g of graphite, 7 g of silicon oxide, 0.5 g of conductive carbon black, 1 g of CMC, and 1.5 g of styrene-butadiene rubber were mixed uniformly and coated on a negative electrode current collector after drying, the drying process belongs to the conventional process in the industry;

S5: Preparation of lithium-ion battery: the positive electrode, negative electrode, and separator were laminated or wound to prepare lithium-ion battery cells. After baking, liquid injection, chemical formation, and packaging, high-safety lithium-ion batteries were obtained.

Examples 3-12 and Comparative Examples 1-2

Preparation process refer to Example 1 to prepare an oil-based safety coating layer or Example 2 to prepare a water-based safety coating layer. The distinguishing features are shown in Tables 2 to 4, and the functional microsphere added in Example 1 is prepared in Preparation Example 1, the functional microsphere added in Example 2 is prepared in Preparation Example 2, and so on, the functional microsphere added in Example 12 is prepared in Preparation Example 12.

TABLE 2

The addition amount and drying conditions of the safety coating
layer slurry in Examples 1-12 and Comparative Examples 1-2

| NO. | Solvent/g | Functional microsphere/g | Conductive agent/g | Binder/g | Auxiliary agent/g | Positive electrode material/g | Drying temperature (° C.) | Drying hour (h) |
|---|---|---|---|---|---|---|---|---|
| Example 1 | 1000 | 90 | 2.9 | 2 | 0.1 | 5 | 110 | 12 |
| Example 2 | 200 | 20 | 25 | 40 | 10 | 5 | 90 | 72 |
| Example 3 | 500 | 20 | 30 | 15 | 5 | 30 | 95 | 20 |
| Example 4 | 400 | 66 | 10 | 10 | 4 | 10 | 110 | 30 |
| Example 5 | 800 | 45 | 22 | 5 | 3 | 35 | 95 | 26 |
| Example 6 | 300 | 50 | 16 | 4 | 7 | 23 | 105 | 60 |
| Example 7 | 500 | 45 | 35 | 8 | 2 | 10 | 96 | 70 |
| Example 8 | 700 | 30 | 15 | 10 | 5 | 40 | 100 | 56 |
| Example 9 | 600 | 25 | 20 | 20 | 10 | 25 | 105 | 55 |
| Example 10 | 600 | 70 | 10 | 5 | 3 | 12 | 98 | 65 |
| Example 11 | 600 | 70 | 10 | 5 | 3 | 12 | 98 | 65 |
| Example 12 | 600 | 50 | 25 | 8 | 2 | 15 | 106 | 48 |
| Comparative Example 1 | — | — | — | — | — | — | — | — |
| Comparative Example 2 | 600 | — | 25 | 8 | 2 | 15 | 106 | 48 |

TABLE 3

Composition of safety coating layer slurry in Examples 1-12 and
Comparative Examples 1-2

| NO. | Solvent | Conductive agent | Binder | Auxiliary agent | Positive electrode material |
|---|---|---|---|---|---|
| Example 1 | Hydrofluoroether | CNT | Polyvinylidene fluoride | Triethyl Phosphate | Lithium cobaltate |
| Example 2 | water | Acetylene black: carbon nanotubes (mass ratio 1:2) | styrene-butadiene rubber: carboxymethyl cellulose (mass ratio 3:1) | polyethylene glycol | Lithium cobaltate |
| Example 3 | acetone | Conductive carbon black: graphene (mass ratio 1:2) | Polyvinylidene fluoride-hexafluoropropylene | Sodium dodecyl benzene sulfonate | Nickel cobalt manganese ternary material |
| Example 4 | water | Graphene: carbon nanotubes (mass ratio 1:4) | SBR: carboxymethyl cellulose (mass ratio 1:1) | polyethylene glycol | Lithium Iron Phosphate |
| Example 5 | acetone | Acetylene black | Polyvinylidene fluoride | Sodium dodecyl benzene sulfonate | Lithium Iron Phosphate |
| Example 6 | tetrahydrofuran | Conductive carbon black | Polyvinylidene fluoride | Sodium cetyl sulfonate | Lithium Iron Phosphate |
| Example 7 | water | carbon nanotubes | Acrylate | polyethylene oxide | Nickel cobalt manganese ternary material |
| Example 8 | water | Carbon nanotubes: conductive carbon black (mass ratio 1:2) | Ethylene-vinyl acetate copolymer | Stearic acid | Nickel cobalt manganese ternary material |
| Example 9 | Pyridine | Conductive carbon black: graphene (mass ratio 1:2) | Polytetrafluoroethene | branched chain alcohol | Lithium Iron Phosphate |
| Example 10 | water | Conductive carbon black | styrene-butadiene rubber: carboxymethyl cellulose (mass ratio 1:1) | polyethylene glycol | Lithium cobaltate |
| Example 11 | water | Conductive carbon black | styrene-butadiene rubber: carboxymethyl cellulose (mass ratio 1:1) | polyethylene glycol | Lithium cobaltate |
| Example 12 | water | Conductive carbon black | styrene-butadiene rubber: carboxymethyl cellulose (mass ratio 1:1) | polyethylene glycol | Lithium cobaltate |
| Comparative Example 1 | — | — | — | — | — |
| Comparative Example 2 | — | Carbon Nanotubes: Conductive Carbon Black (1:1) | styrene-butadiene rubber: Carboxymethylcellulose (1:1) | polyethylene glycol | Lithium cobaltate |

13

TABLE 4

Structures of positive electrode plates in Examples 1-12 and Comparative Examples 1-2

| NO. | Current collector thickness/ (μm) | Safety coating layer thickness/ (μm) | Fusion layer thickness/ (μm) | Positive electrode layer thickness/ (μm) |
|---|---|---|---|---|
| Example 1 | 12 | 6.0 | 0.5 | 80 |
| Example 2 | 13 | 4.5 | 0.08 | 90 |
| Example 3 | 10 | 5.3 | 0.01 | 30 |
| Example 4 | 20 | 6.5 | 0.5 | 25 |
| Example 5 | 4 | 5.0 | 0.4 | 70 |
| Example 6 | 5 | 5.5 | 0.1 | 65 |
| Example 7 | 10 | 4.5 | 0.005 | 55 |
| Example 8 | 11 | 5.0 | 0.5 | 45 |
| Example 9 | 15 | 4.5 | 0.001 | 65 |
| Example 10 | 10 | 6.0 | 0.01 | 70 |
| Example 11 | 10 | 4.5 | 0.01 | 60 |
| Example 12 | 10 | 6.0 | 0.5 | 50 |
| Comparative Example 1 | 10 | | | 50 |
| Comparative Example 2 | 10 | 6.0 | 0.001 | 50 |

2. Experimental Data (1) Electrode plate resistance test: The ACCFILM diaphragm resistance test instrument was used, which uses the controllable voltage double probe resistance to directly test the overall resistance of the electrode plate, and the output measurement value was the electrode plate resistance. The test process was as follows: the probe was tested by applying a suitable surface flatness and pressing 10N. The test device was placed in an oven, the initial temperature of the oven was 20° C., the temperature increased to 150° C. at a heating rate of 2° C./min, and the data was recorded in real time.

Figure 3:
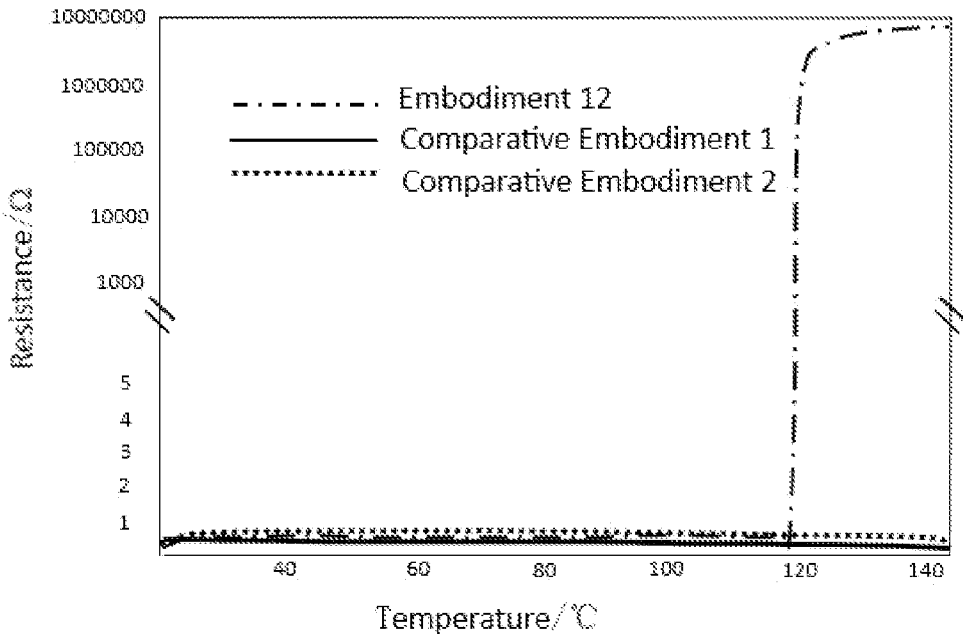
FIG. 3 is a curve showing the change of the resistance value of the positive electrode plates prepared in Example 12, Comparative Example 1, and Comparative Example 2 as the temperature increases.

FIG. 3 is a curve of the resistance value changes of the positive electrode plate of Example 12, Comparative Example 1 and Comparative Example 2 as the temperature increases; it may be seen from FIG. 3 that the positive electrode plate of Example 12 is at 20° C.-115° C., the resistance of the positive electrode plate changes little with temperature. Within 115° C.-140° C., as the heat-sensitive polymer on the surface of the functional microsphere in the positive electrode plate fuses to form a plurality of continuous electron blocking layers, the coating layer formed current blocking, blocking the passage of ions and electrons, improving battery safety performance.

Figure 4:
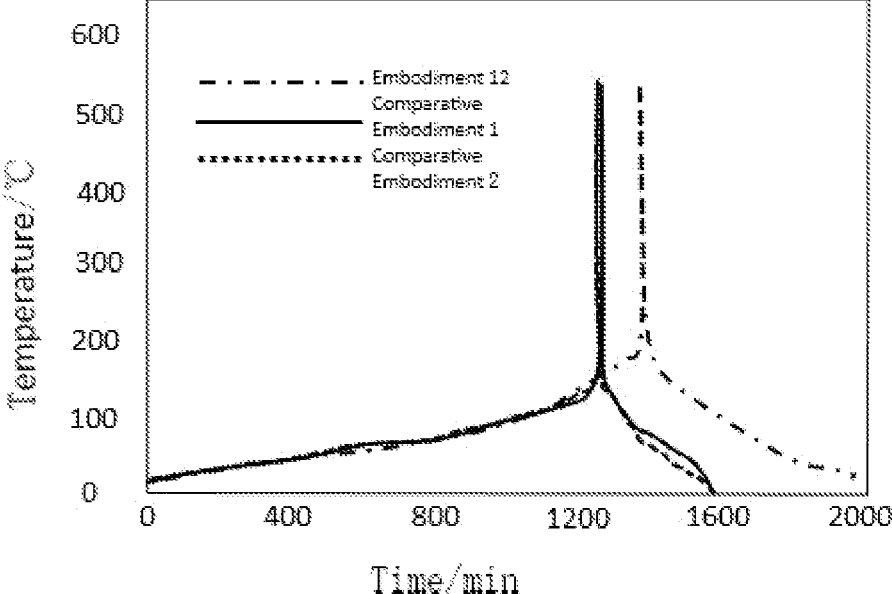
FIG. 4 is the ARC test results of the batteries prepared in Example 12, Comparative Example 1, and Comparative Example 2.

(2) Battery thermal test method: the state of the batteries prepared in Example 12, Comparative Example 1, and Comparative Example 2 at different temperatures was detected by a British HEL brand—PhiTEC I (ARC) model adiabatic acceleration calorimeter. The inside of the instrument is heated at a rate of 0.15° C./min, and the temperature of the battery is tested. The test results are shown in FIG. 4. By comparing the ARC test results of the batteries prepared in Example 12, Comparative Example 1 and Comparative Example 2, it was found that the batteries of Comparative Examples 1-2 had thermal runaway at about 180° C., and the battery burned violently; thermal runaway occurs at about 195° C. in the battery of Example 12. The main reason: during the temperature of the battery from 100° C. to 180° C., there is SEI film cracking, and the positive electrode and the electrolyte react violently, especially in the range of 160° C. to 180° C., the battery of Comparative Example 1 and Comparative Example 2 will have severe thermal runaway or fire, etc. When the temperature of the battery in the disclosure is raised from 100° C. to 180° C., a barrier layer is formed inside the battery when the sensitive-temperature is reached. The barrier layer effectively increases the battery failure temperature, prolongs the battery safety time, and increases the battery thermal runaway temperature.

(3) AC impedance test method of battery internal resistance: Using Metrohm PGSTAT302N chemical workstation in the range of 100 KHz-0.1 mHz, under the condition of 25° C., AC impedance test of lithium-ion battery was carried out.

(4) Test method of battery cycle performance: Lithium-ion battery was charged and discharged on the blue battery charge and discharge test cabinet, and the test conditions are 25° C., 50% humidity, and 1C/1C charge and discharge.

TABLE 5

EIS test and battery cycle performance test results of the batteries prepared in Examples 1-12 and Comparative Examples 1-2

| NO. | Battery internal resistance (mΩ) | Capacity maintained at 80% cycle times |
|---|---|---|
| Example 1 | 52.31 | 1263 |
| Example 2 | 60.79 | 861 |
| Example 3 | 23.25 | 5832 |
| Example 4 | 41.22 | 1830 |
| Example 5 | 57.71 | 1040 |
| Example 6 | 48.45 | 1143 |
| Example 7 | 37.76 | 1642 |
| Example 8 | 49.63 | 1440 |
| Example 9 | 51.53 | 1163 |
| Example 10 | 56.12 | 1030 |
| Example 11 | 52.51 | 1175 |
| Example 12 | 50.73 | 1213 |
| Comparative Example 1 | 45.73 | 1078 |
| Comparative Example 2 | 49.76 | 1153 |

By comparing the EIS test results of the batteries prepared in Examples 1-12 and 1-2, it was found that:

1) In the batteries prepared in Examples 1-12, the thickness of the positive electrode plate in the batteries prepared in each Example increases, resulting in increased lithium-ion and electron transport barriers, and increased battery impedance, resulting in a decrease in the number of effective battery cycles.

2) In the batteries prepared in Examples 10-12: the difference is that the thickness of the positive electrode plate is different, the thickness of the positive electrode layer in Example 10 is 70 and the thickness of the positive electrode layer in Example 11 is 60 The positive electrode layer in the positive electrode plate increases, the lithium-ion and electron transmission paths inside the electrode plate increase, and the battery impedance increases, which leads to a decrease in battery performance;

3) Experimental results of Example 12, Comparative Example 1, Comparative Example 2:

Battery internal resistance: Comparative Example 1<Comparative Example 2<Example 12, the main reason is that there is no positive electrode coating layer in Comparative Example 1, resulting in a small internal resistance of the battery. In general, the internal resistance of the battery is not much different;

The number of battery cycles: Example 12≈Comparative Example 2>Comparative Example 1, the main reason is that there is no positive electrode coating layer in Comparative Example 1, although the internal resistance of the battery is slightly smaller in the early stage, but with the cycle of the battery, the polarization and dynamic internal resistance of the battery will increase, resulting in poor battery cycling.

To sum up, the test results of the battery cycle performance by comparing Examples 1-12 and 1-2 show that the lithium-ion battery prepared in the present disclosure may suppress the battery polarization and reduce the dynamic internal resistance increase during the battery cycle process; at the same time, the lithium-ion battery positive electrode prepared in the present disclosure has better uniformity and effectively improve the battery cycle life. The experimental results show that the lithium-ion battery prepared by the present disclosure has good safety.

The embodiments of the present disclosure have been described above. However, the present disclosure is not limited to the above-described embodiment. Any modification, equivalent replacement, improvement, made within the spirit and principle of this disclosure shall be included within the protection scope of this disclosure.

What is claimed is:

1. A positive electrode plate, comprising a positive electrode current collector, a safety coating layer, a composite fusion layer and a positive electrode active material layer, wherein:

the safety coating layer, the composite fusion layer and the positive electrode active material layer are arranged on a surface of the positive electrode current collector in sequence;

the safety coating layer comprises a functional microsphere, a first positive electrode active material, a first conductive agent, a first binder and an auxiliary agent; the positive electrode active material layer comprises a second positive electrode active material, a second conductive agent and a second binder; and the composite fusion layer comprises the functional microsphere, the first positive electrode active material, the first conductive agent, the first binder, the second positive electrode active material, the second conductive agent, the second binder, and the auxiliary agent; and based on a total weight of the second positive electrode active material, the second conductive agent, and the second binder, the composite fusion layer comprises the following components by weight percentage: 80-99 wt % of the second positive electrode active material, 0.5-10 wt % of the second conductive agent and 0.5-10 wt % of the second binder.

2. The positive electrode plate according to claim 1, wherein the safety coating layer comprises the following components by weight percentage: 20-90 wt % of the functional microsphere, 5-60 wt % of the first positive electrode active material, 2.9-30 wt % of the first conductive agent, 2-40 wt % of the first binder and 0.1-10 wt % of the auxiliary agent.

3. The positive electrode plate according to claim 1, wherein the safety coating layer comprises the following components by weight percentage: 20-70 wt % of the functional microsphere, 5-40 wt % of the first positive electrode active material, 2.9-25 wt % of the first conductive agent, 2-30 wt % of the first binder and 0.1-5 wt % of the auxiliary agent.

4. The positive electrode plate according to claim 1, wherein the safety coating layer comprises the following components by weight percentage: 30-60 wt % of the functional microsphere, 10-30 wt % of the first positive electrode active material, 5-20 wt % of the first conductive agent, 5-20 wt % of the first binder and 0.1-4 wt % of the auxiliary agent.

5. The positive electrode plate according to claim 1, wherein the positive electrode active material layer comprises the following components by weight percentage: 80-99 wt % of the second positive electrode active material, 0.5-10 wt % of the second conductive agent and 0.5-10 wt % of the second binder.

6. The positive electrode plate according to claim 1, wherein the positive electrode active material layer comprises the following components by weight percentage: 84-99 wt % of the second positive electrode active material, 0.5-8 wt % of the second conductive agent and 0.5-8 wt % of the second binder.

7. The positive electrode plate according to claim 1, wherein the positive electrode active material layer comprises the following components by weight percentage: 90-98 wt % of the second positive electrode active material, 1-5 wt % of the second conductive agent and 1-5 wt % of the second binder.

8. The positive electrode plate according to claim 1, wherein based on a total weight of the functional microsphere, the first positive electrode active material, the first conductive agent, the first binder, and the auxiliary agent, the composite fusion layer comprises the following components by weight percentage: 20-90 wt % of the functional microsphere, 5-60 wt % of the first positive electrode active material, 2.9-30 wt % of the first conductive agent, 2-40 wt % of the first binder and 0.1-10 wt % of the auxiliary agent.

9. The positive electrode plate according to claim 1, wherein a thickness of the positive electrode current collector is 0.1 μm-20 μm; and/or a thickness of the safety coating layer is 0.1 μm-8 μm; and/or, a thickness of the composite fusion layer is 0.001 μm-0.5 μm; and/or, a thickness of the positive electrode active material layer is 5 μm-200 μm.

10. The positive electrode plate according to claim 1, wherein a thickness of the positive electrode current collector is 2 μm-15 μm; and/or a thickness of the safety coating layer is 0.2 μm-6 μm; and/or a thickness of the positive electrode active material layer is 5 μm-100 μm.

11. The positive electrode plate according to claim 1, wherein the functional microsphere has a core-shell structure which comprises a shell layer and a core, and a material forming the shell layer comprises a heat-sensitive polymer, a material forming the core comprises a conductive material.

12. The positive electrode plate according to claim 11, wherein a particle size of the functional microsphere is 50 nm-6.5 μm; a particle size of the conductive material is 0.1 nm-4.5 μm.

13. The positive electrode plate according to claim 11, wherein a particle size of the functional microsphere is 500 nm-5 μm; and/or a thickness of the shell layer is 1 nm-2000 nm in the functional microsphere.

14. The positive electrode plate according to claim 11, wherein the heat-sensitive polymer is a thermoplastic polymer; and/or the heat-sensitive temperature range of the heat-sensitive polymer is 110° C. to 160° C.

15. The positive electrode plate according to claim 14, wherein the heat-sensitive polymer is at least one selected from the group consisting of polyethylene, polypropylene, polyamide, polyesteramide, polystyrene, polyvinyl chloride, polyester, polyurethane, ethylene vinyl acetate polymer, ethylene acrylate polymer, olefin copolymer, propylene copolymer, ethylene copolymer, and polymer copolymerized with monomers thereof.

16. The positive electrode plate according to claim 11, wherein the conductive material is at least one selected from the group consisting of conductive polymer, conductive oxide, metal particle, carbon material, and conductive ceramic.

17. The positive electrode plate according to claim 11, wherein the conductive material is at least one selected from the group consisting of polypyrrole, polythiophene, conductive carbon black, ketjen black, conductive fiber, acetylene black, carbon nanotube, graphene, flake graphite, silicon carbide, molybdenum disilicide, and lanthanum cobaltate.

18. The positive electrode plate according to claim 1, wherein the first positive electrode active material and/or the second positive electrode active material are selected from one or a combination of lithium iron phosphate, lithium cobalt oxide, lithium nickel cobalt manganese oxide, lithium manganate, lithium nickel cobalt aluminate oxide, lithium nickel cobalt manganese aluminate oxide, nickel-cobalt-aluminum-tungsten material, lithium-rich manganese-based solid solution positive electrode materials, lithium nickel cobalt oxide, lithium nickel titanium magnesium oxide, lithium nickelate, lithium spinel manganate or nickel cobalt tungsten.

19. A secondary battery, wherein the secondary battery comprises the positive electrode plate according to claim 1.

\* \* \* \* \*